Figures 1, 2, 3, 4, 5, 6, 7:
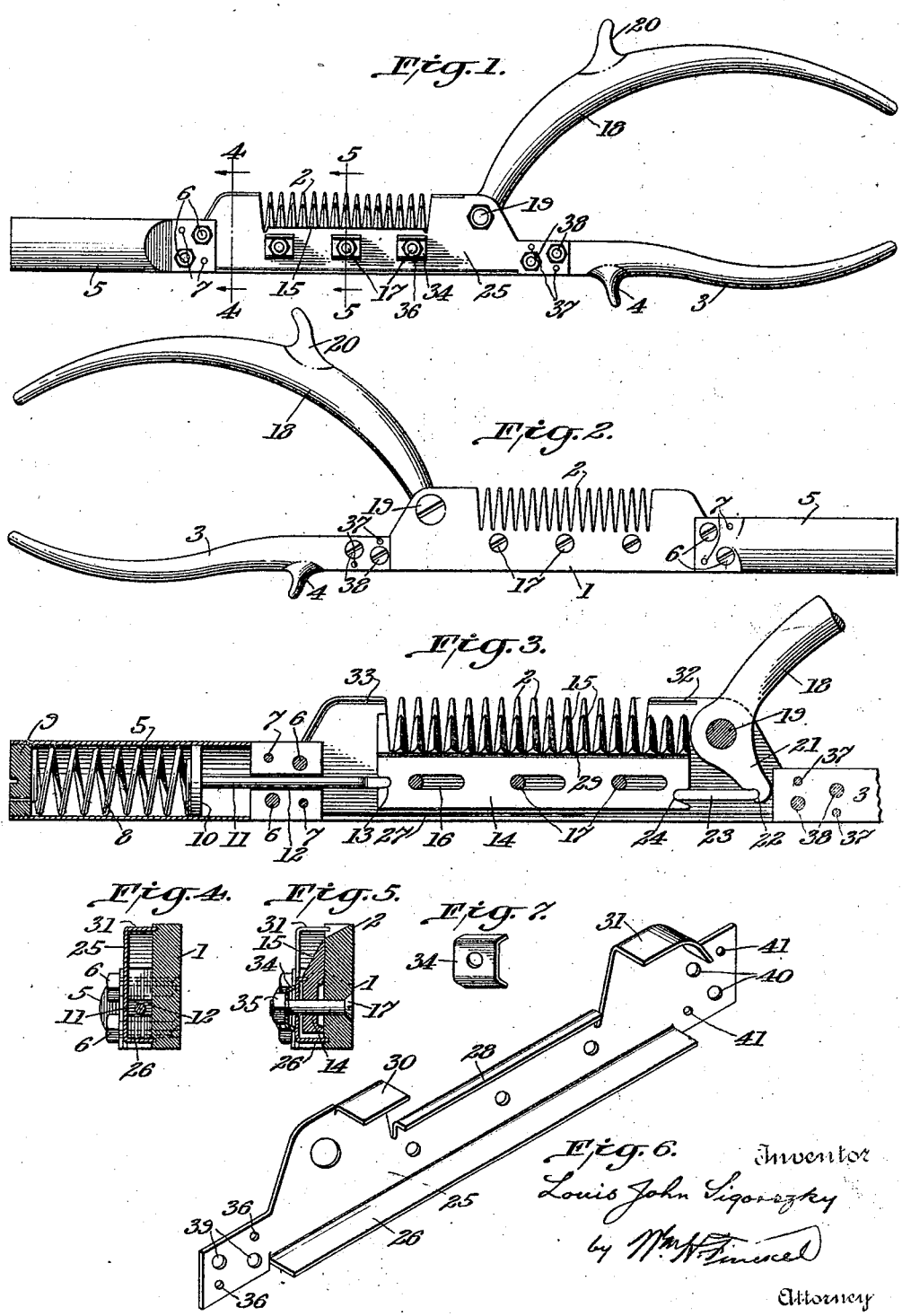

L. J. SIGORSZKY.
HAIR CUTTER.
APPLICATION FILED JULY 31, 1920.

1,426,226. Patented Aug. 15, 1922.

Inventor
Louis John Sigorszky
by
Attorney

UNITED STATES PATENT OFFICE.

LOUIS JOHN SIGORSZKY, OF EASTON, PENNSYLVANIA.

HAIR CUTTER.

1,426,226.                    Specification of Letters Patent.    Patented Aug. 15, 1922.

Application filed July 31, 1920. Serial No. 400,428.

*To all whom it may concern:*

Be it known that I, LOUIS JOHN SIGORSZKY, a citizen of the United States, residing at Easton, in the county of Northampton and State of Pennsylvania, have invented a certain new and useful Improvement in Hair Cutters, of which the following is a full, clear, and exact description.

This invention relates to an improvement in hand implements for cutting or trimming hair; and the invention consists in a haircutter in which there are supporting handles at opposite ends, between which is mounted a stationary comb, which is surmounted by a reciprocating cutter-bar moved in one direction positively by a movable handle member or operating lever against the tension of a spring arranged in one of the handles and which additionally serves to effect the return movement of the cutter-bar when pressure on the operating lever is released, the construction, combination and arrangement of parts being substantially as I will proceed now to explain and finally claim.

In the accompanying drawings illustrating the invention, in the several figures of which like parts are similarly designated, Figure 1 is a top plan view, and Fig. 2 is an inverted plan view of the implement. Fig. 3 is a longitudinal horizontal section, on a larger scale, taken through the spring-containing handle and above the cutter-bar. Fig. 4 is a transverse section on line 4—4 of Fig. 1. Fig. 5 is a transverse section on line 5—5 of Fig. 1. Fig. 6 is a perspective view of the enclosing cover or casing detached. Fig. 7 is a perspective view of a spring washer.

The views 4, 5, 6 and 7 are substantially on the same scale as Fig. 3.

The back-plate 1 may be provided with the teeth 2 to serve as a comb, and this back-plate may be made in one piece with the stationary handle 3, having the finger-stop 4. 5 is a cylindrical casing which may be attached to the back-plate by means of screws 6 in connection with dowel-pins 7 and containing the coiled spring 8, the end of the cylinder being closed by a screw-plug 9 or other suitable device. Within the casing 5 is a plunger 10 having a stem 11 projecting through the block 12 which may be a part of the back-plate 1. This plunger stem fits in a notch 13 of the cutter-bar 14. Said cutter-bar is provided with cutter-fingers 15, and has the longitudinal slots 16 which are engaged by bolts 17 set in the back-plate, so that said cutter-bar may have longitudinal movement upon the back-plate and over its comb-teeth. 18 is the movable handle or operating lever, pivoted at 19 on the back-plate, and having the finger-stop 20. 21 is an extension arm of the operating lever 18, in the end of which is a notch 22 which is engaged by a push-pin or link 23 which in turn engages a notch 24 in the adjacent end of the cutter-bar, so that when the operating lever is moved toward the fixed lever or handle member 3, the link 23 will push against the cutter-bar and against the tension of the spring 8 to move the cutter-bar longitudinally of the implement and transversely of the comb teeth. The return movement is effected by the spring 8 through the plunger 10 and stem 11, so that a reciprocating motion is given to the cutter-bar transversely of the comb teeth.

The members 3 and 5 serve as handles for convenience in using the implement with both hands when so desired.

The cutter-bar and the operative parts adjacent thereto are enclosed by a cover or casing 25, as shown in detail in Fig. 6. This cover or casing has a longitudinal flange 26 which forms the back of the implement and engages a groove 27 in the back-plate 1; a parallel flange 28 which overhangs the cutter-bar and engages a groove 29 therein and serves to keep it in place, and flanged extensions 30 and 31 which engage grooves 32 and 33 respectively in the back-plate and serve to enclose the underlying parts. This cover or casing may be secured in place by the transverse bolts 17, and in order to provide for the requisite freedom of movement and at the same time insure the alinement of the cutter-bar and comb, I may use elastic washers 34 and the nuts 35 on the bolts 17. Further one end of the cover or casing may have holes 36 to receive the dowel pins 37 on the back-plate, and in addition bolts 38 may be passed through appropriate holes in the back-plate and holes 39 in the cover or casing to firmly secure the latter in place at the end adjacent to the handle 3; and similar holes 40 and 41 are provided at the other end of the casing to accommodate the bolts 6 and dowel-pins 7, respectively.

Thus it will be seen that the parts are accessible for repair, or interchange, as may be necessary or desirable, and a very simple and convenient hair-cutter provided.

Variations in the details of construction and arrangement of parts are permissible within the principle of the invention as hereinafter claimed.

What I claim is:—

1. A hair-cutter, comprising a back plate provided with comb teeth and a stationary handle, and a reciprocating cutter-bar arranged on said back-plate, an operating lever movably connected with said cutter-bar at one end, a concealed spring movably connected with said cutter-bar at the other end and in substantial alinement therewith, and a cover for the body of the cutter-bar and its operating parts.

2. A hair-cutter, comprising a back plate provided with comb teeth and a stationary handle, and a reciprocating cutter-bar arranged on said back-plate, an operating lever pivoted on the back plate and movably connected with said cutter-bar at one end and a spring movably connected with said cutter-bar at the other end and in substantial alinement therewith, and a cylindrical container for said spring fixed to the back-plate at the end opposite the operating lever.

3. A hair-cutter, comprising a back-plate provided with comb teeth and a stationary handle, and a reciprocating cutter-bar arranged on said back-plate, an operating lever pivotally mounted upon the back-plate and movably connected with said cutter-bar at one end, a concealed spring movably connected with said cutter-bar at the other end and in substantial alinement therewith, and a cover for the body of the cutter-bar and its operating parts.

4. A hair-cutter, comprising a back-plate provided with comb teeth, a stationary handle at one end, a reciprocating cutter-bar arranged upon the back-plate and capable of longitudinal movement thereon, an operating lever pivoted on the back-plate next to the stationary handle, a link connecting said operating lever with the cutter-bar, a spring applied to the back-plate at the end opposite the end containing the operating lever, and a plunger and stem interposed between said spring and said cutter-bar.

5. A hair-cutter, comprising a back-plate provided with comb teeth and a stationary handle, and a reciprocating cutter-bar arranged on said back-plate, an operating lever movably connected with said cutter-bar at one end and a spring movably connected with said cutter-bar at the other end and in substantial alinement therewith, a cylindrical container for said spring fixed to the back-plate at the end opposite the operating lever, and a cover or casing applied to the back-plate over the cutter-bar.

In testimony whereof I have hereunto set my hand this 27th day of July, A. D. 1920.

LOUIS JOHN SIGORSZKY.

Witnesses:
NEAL V. KENNEDY,
JOHN J. CUNNINGHAM.